United States Patent [19]

Haaser

[11] Patent Number: 4,944,379

[45] Date of Patent: Jul. 31, 1990

[54] TORQUE LIMITER

[75] Inventor: James D. Haaser, Toledo, Ohio

[73] Assignee: Dynamic Research and Development Corp., Toledo, Ohio

[21] Appl. No.: 116,976

[22] Filed: Nov. 5, 1987

[51] Int. Cl.⁵ .............................................. F16D 9/00
[52] U.S. Cl. .................................. 192/150; 192/56 R;
                                                464/33; 464/45
[58] Field of Search .................... 192/56 R, 150, 48.5,
         192/67 P, 30 W; 464/30, 32, 33, 45; 403/2,
                                                         DIG. 3

[56]            References Cited
        U.S. PATENT DOCUMENTS

| | | | |
|---|---|---|---|
| 912,488 | 2/1909 | Richards | 403/DIG. 3 X |
| 1,672,582 | 6/1928 | Tenney | 192/67 R X |
| 2,038,896 | 4/1936 | Fast | 192/56 R |
| 2,124,965 | 7/1938 | Lind | 192/150 |
| 2,125,270 | 8/1938 | Conover | 464/30 |
| 2,307,556 | 1/1943 | Wileman | 464/33 |
| 2,641,116 | 6/1953 | Russell | 464/33 |
| 3,103,004 | 9/1963 | Murray | 464/33 X |
| 3,866,728 | 2/1975 | Orwin | 192/56 R |
| 4,028,909 | 6/1977 | Jancic et al. | 464/33 X |
| 4,572,342 | 2/1986 | Weiss et al. | 192/56 R |

Primary Examiner—Richard M. Lorence
Attorney, Agent, or Firm—Earl L. Tyner

[57]            ABSTRACT

A mechanical device for limiting the maximum torque transferred from a driving shaft to a driven power transmission element including an adapter which rotates fully around a power transmission element; a sleeve firmly affixed to and rotating with the driving shaft; a high friction clutch element pressed between the sleeve and the adapter; and a shear pin connecting the sleeve and the adapter, and providing a compressive force on the clutch element.

11 Claims, 2 Drawing Sheets

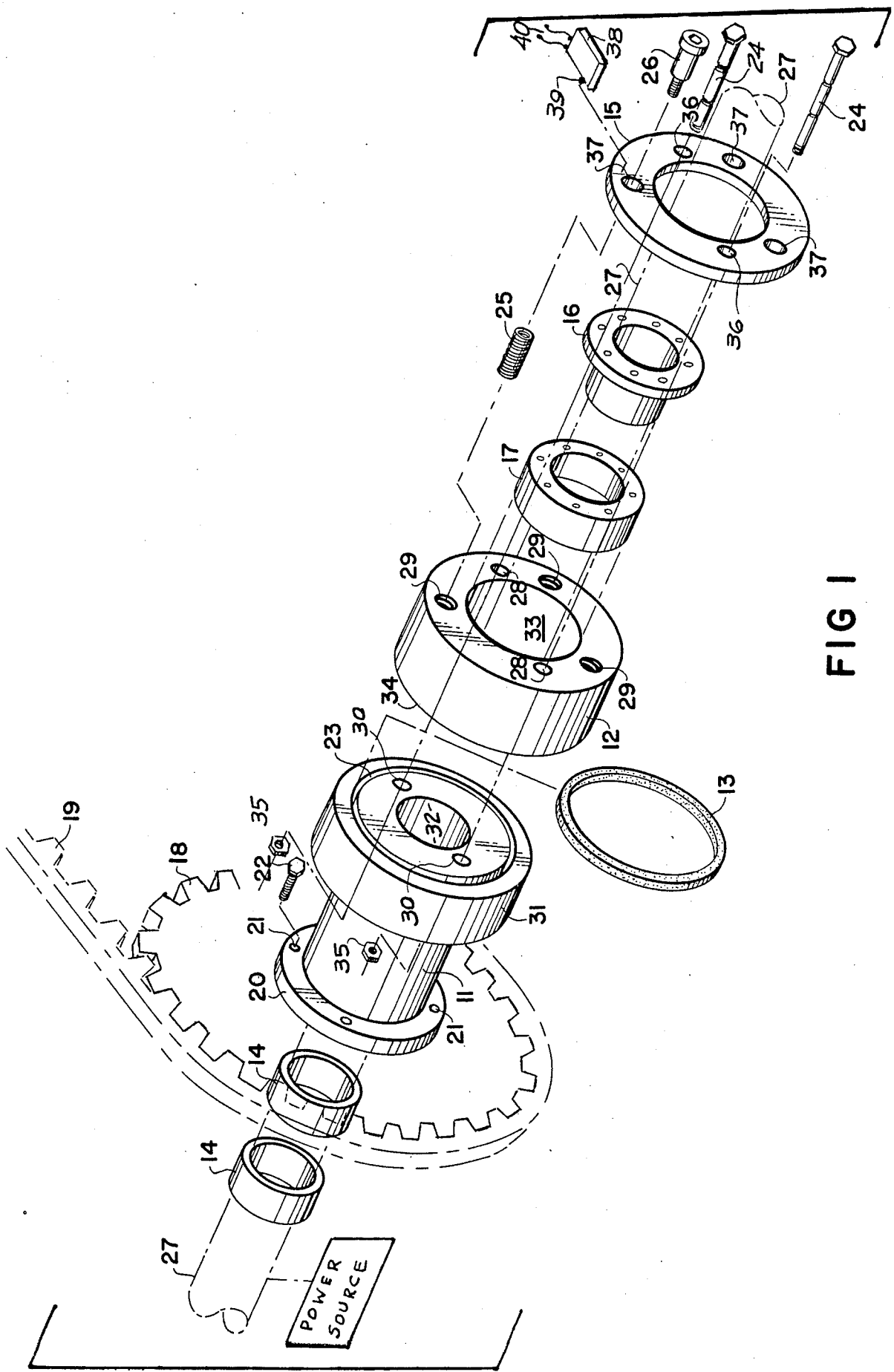

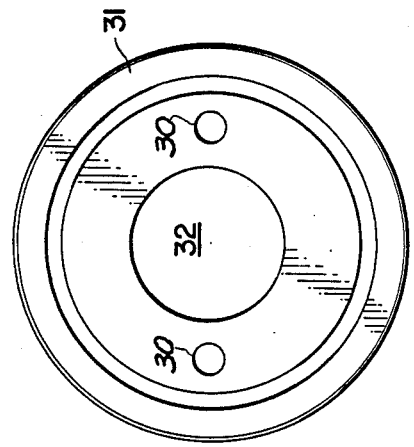
FIG 4
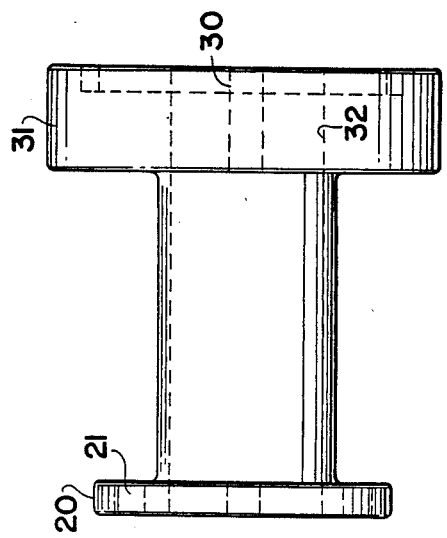
FIG 3
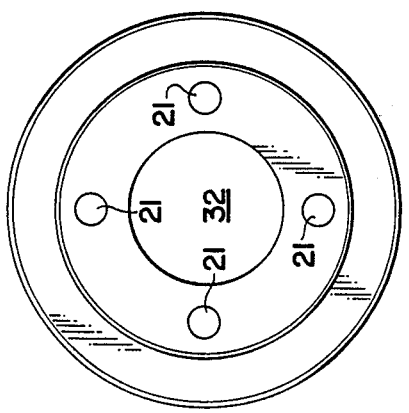
FIG 2
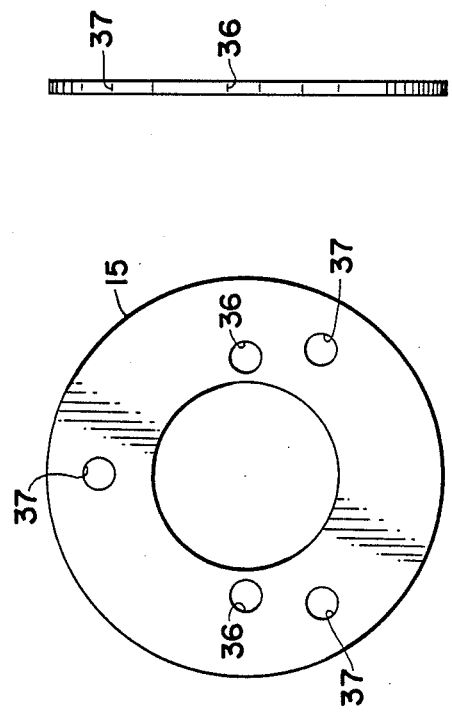
FIG 8
FIG 7
FIG 6
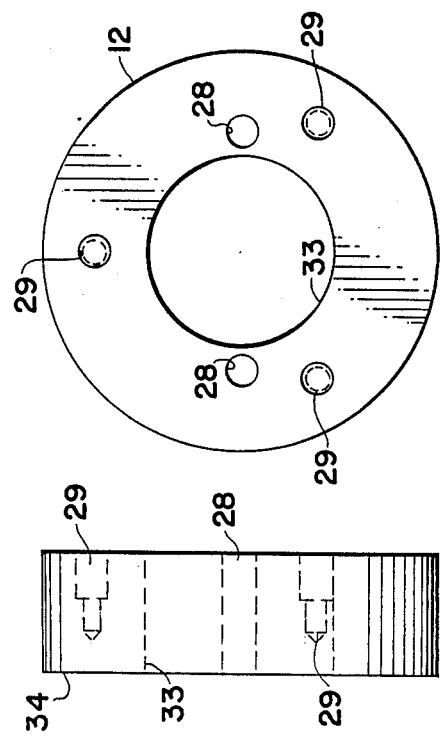
FIG 5

TORQUE LIMITER

BACKGROUND OF THE INVENTION

In power transmission equipment of all types there frequently is a need to provide a safety device which interrupts the transmission of torque, if the loading becomes too great. For example, an engine driving several pieces of equipment may, due to a mechanical failure and without the knowledge of the operator, have all the torque directed to only one of the pieces of equipment which is not designed to operate at such high torque. In such situations it is desirable to employ a torque limiter which, upon reaching a preselected level of torque, will interrupt the transmission of power and let the driving force run free or turn it off. The usual type of device used in the past for this purpose relied on shear pins or bolts which would break when a certain level of torque was reached, such as the machine described in U.S. Pat. No. 1,672,582 to Tenney. Shear pin devices are particularly vulnerable to failure by fatigue forces, which occur when the pin or bolt is subjected to repeating cycles of being stressed and then released. A shear pin device is, therefore, limited in its utility to a load at or below the fatigue endurance limit of the shear pin material. Thus, a shear pin can not be relied upon to function as a torque limiter at stresses between its fatigue endurance limit and its ultimate strength.

In order to avoid the disadvantages of a shear pin device there have been inventions employing spring loaded pawls, detents, and the like as a torque limiter that could be reset to function again after interrupting the transmission of power in its normal operation. U.S. Pat. Nos. 2,038,896 and 3,866,728 describe devices of this type. This type of torque limiter involves some radial movement before the power is interrupted, and because repeated use of the device results in wear of the radial movement components, there is a continuing change in the release torque over a period of time at which the device operates. This is an undesirable characteristic where one wants the device to function at a precise, unchanging torque level.

Friction clutch devices have also been used for torque limiters. Two opposed surfaces are pressed together with sufficient force to rotate together when one is driven and the other is not. If the frictional forces are sufficient, the power will be transmitted; and if the forces are insufficient, the surfaces will slip with respect to each other. These devices are unsuitable in many applications because there is no positive interruption of power transmission, but rather an irregular, chaotic series of slips and catches to provide a jerky transmission of some power.

U.S. Pat. No. 4,572,342 to Weiss et al. describes a torque limiter which combines the use of opposing faces of a frictional clutch member and spring biased ball devices as a clutch element. This device, however, suffers from the above-described problem of the maximum torque changing as wear occurs in the ball engaging surfaces permitting more and more radial movement before the power is interrupted.

It is an object of this invention to provide an improved torque limiter combining the best features of a shear pin device with a frictional clutch member. It is another object of this invention to provide a torque limiting device which has negligible radial movement, and therefore, a maximum torque transmission which does not change with time or with the wear of the device. It is still another object of the invention to provide a torque limiting device which is not subject to fatigue stresses that lower the maximum torque transmission by shear pins. Still other objects will appear from the more detailed description which follows.

BRIEF SUMMARY OF THE INVENTION

This invention relates to a torque limiter for use on a driving shaft delivering torque to a driven power transmission element being rotated by said shaft; the device comprising:

(a) an adaptor which rotates freely around said shaft and has attached thereto a power transmission element;

(b) a sleeve firmly affixed to said shaft;

(c) a clutch element having opposed surfaces possessing a high coefficient of friction and adapted to be compressed between said adaptor and said sleeve; and (d) shear pin means connecting said adaptor and said sleeve by a selected compressive force on said clutch element therebetween.

In preferred embodiments of this invention the torque limiter includes a ring of compressible high friction material retained in a groove in the adaptor and pressed against a face of the sleeve by two shear bolts passing through the adaptor and the sleeve. In another embodiment the device includes a warning device which is actuated when there is a breakage of the shear bolts.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is an exploded perspective view of the torque limiter of invention;

FIG. 2 is a top plan view of the adaptor of this invention;

FIG. 3 is a front elevational view of the adaptor of FIG. 2;

FIG. 4 is a bottom plan view of the adaptor of FIGS. 2 and 3:

FIG. 5 is front elevational view of the sleeve of this invention;

FIG. 6 is a bottom plan view of the sleeve of FIG. 5;

FIG. 7 is a bottom plan view of the actuator plate of this invention; and

FIG. 8 is a front elevational view of the actuator plate of FIG. 7.

DETAILED DESCRIPTION OF THE INVENTION

In FIG. 1 of the attached drawings there is shown the manner in which the device of this invention is used as a torque limiter in a power transmission system in which driving shaft 27 connected to a power save sprocket turns 18 to drive belt 19. In the absence of a torque limiter it might be possible for sprocket 18 unintentionally to become overloaded to a higher torque that would be unsuitable or even damaging to the equipment being driven by belt 19. In order to protect the equipment from the possibility of damage, the torque limiter of this invention is inserted into the power train at the juncture of shaft 27 and sprocket 18. When properly adjusted to transmit not more than a preselected maximum torque, the connection between shaft 27 and sprocket 18 will be broken, if that maximum torque is exceeded, and sprocket 18 will coast to a halt.

The torque limiter of this invention involves four components; namely, adaptor 11, sleeve 12, friction clutch member 13, and shear bolts 24.

Adaptor 11 is a hollow tubular member having a flange 20 at one end and a flange 31 at the other end. The hollow tubular interior 32 is large enough to permit shaft 27 to pass through with bushings 14 allowing adaptor 11 to rotate freely around shaft 27. Flange 20 contains bolt holes 21 in sufficient number and size to fasten pulley 18 thereto with bolts 22. Any other method of attaching sprocket 18 to flange 20 is operable so long as pulley 18 turns with flange 20 and adaptor 11 is free of any influence of shaft 27. It is to be understood that sprocket 18 and belt 19 are merely illustrative of any of a wide variety of power transmission devices that may be used with this invention. For example, the power transmission device may be a pair of gears, a pulley and V-belt, a sprocket and chain, or the like, where one component is rotatable by a shaft and drives the other component by a transmission of the torque of the shaft. Flange 31 on adaptor 11 includes an annular groove 23 to function as a seat for ring 13, the frictional clutch element, and also includes holes 30 for the attachment of shear bolts 24.

Sleeve 12 is attached firmly to shaft 27 by any suitable attaching means, such as splines or a key. A preferred attaching means is shown here to include a tapered sleeve 16 and a clamp ring 17, with the latter being fitted into central openinq 33 in sleeve 12. Sleeve 12 also contains holes 28 for shear bolts 24 and a plurality, e.g. three, holes that are counterbored 29 to receive limit screws 26.

Friction clutch member 13 is shown as a ring of material having a high coefficient of friction and is as wear resistant as possible. Ring 13 is seated in groove 23 in the face of flange 31, and is pressed against the opposing face 34 of sleeve 12. Thus, the thickness of ring 13 is greater than the depth of groove 23 so that the ring 13 may be compressed tightly against face 34 of sleeve 12. The compressive force to squeeze ring 13 between face 34 and groove 23 is applied by tightening shear bolts 24 in nuts 35 through holes 28 in sleeve 12 and holes 30 in flange 31 of adaptor 11. When shear bolts 24 are broken, the compressive force on ring 13 is completely released. The material from which ring 13 is made may be any substance having a high coefficient of friction and wear properties suitable for the purpose. Compositions of cork and rubber used in gaskets are suitable, as well as composite structures of plastic, wood, paper, cork, metal, rubber, fabric, and the like. It also is contemplated that the shape of the friction clutch member 13 may be other than a ring. For example, a disc, like certain automotive brake pads, may be used, if they can be compressed between adaptor 11 and sleeve 12.

Shear bolts 24 are designed to have a selected shear force by reason of the material from which they are made, and/or by reason of their minimum cross sectional dimension, or both. Shear bolts 24 pass through holes 36 in actuator plate 15, through holes 28 in sleeve 12, and through holes 30 in adaptor 11 to be threaded into nuts 35. There is no critical number of shear bolts 24 to be used, although at least two are preferred so as to be equally spaced around shaft 27 to provide an equalized compressive force around ring 13.

The combination of friction clutch member 13 and shear bolts 24 is a superior arrangement because it permits at least 80% of the torque to be transmitted by the friction forces of ring 13 and the remaining 20% to be transmitted by shear bolts 24. It is desirable to maximize the proportion of torque transmitted by friction clutch member 13 and at the same time to provide an immediate release of power transmission when the preselected torque is reached. As a practical matter, not more than about 80-90% can be proportioned to the clutch element 13 because of the strength properties of shear bolts 24. With a proportion of about 80:20 the friction ring 13 will transmit all of the torque until it approaches the preselected maximum, i.e. until about 80% of the maximum is reached. Ring 13 will then slip and shear bolts 24 will become loaded and prevent any further slippage until the maximum torque is reached. If the torque is increased to the maximum, bolts 24 will be sheared and the transmission of torque is immediately ceased. There is no time lag which might throw off the phasing of the associated equipment or any time delay in which the equipment might become damaged. The device of this invention may also be operated in reverse at exactly the same level of maximum torque transmission. There is no radial movement other than that necessary to load the shear bolts 24 occasioned by the tolerance between the shear bolts 24 and the holes 28 and 30 through which bolts 24 are assembled in this torque limiter. This is a negligible amount, and slippage of ring 13 is substantially zero in this device.

A preferred component on this device is one which will shut off the power to shaft 27, or at least warn the operator that power transmission has been interrupted. A preferred arrangement includes actuator plate 15 cooperating with two or more shoulder limit screws passing through holes 37 in plate 15, through springs 25, and seated in counterbored and tapped holes 29 in sleeve 12 with spring 25 compressed and contained in the counterbore position of holes 29. At the moment shear bolts 24 break the warning device should operate to shut off power or sound a warning to the operator. In the enbodiment shown here this is accomplished by the action of plate 15, springs 25, and screws 26. Prior to the breaking of shear bolts 24 plate 15 is compressed against sleeve 12 by the tightening of bolts 24 in nuts 35. At the moment of breakage of bolts 24 springs 25 push plate 15 to the right (in FIG. 1) away from sleeve 12 and against the heads of screws. This movement is sensed by button 39 of switch 38 which completes an electric circuit through leads 40 that turns off the power to shaft 27 or provides a warning (buzzer, flashing lights, or the like) to the operator.

While the invention has been described with respect to certain embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A torque limiting device for use on a shaft delivering torque to a power transmission element being rotated by said shaft; the device comprising:
   (a) an adapter which rotates freely around said shaft and is attached at one end thereof to a power transmission element and having a planar face at the other end thereof;

(b) a sleeve firmly affixed to said shaft adjacent to said face;

(c) a clutch element having opposing surfaces with a high coefficient of friction and adapted to be compressed between said adapter and said sleeve; and (d) shear pin means connecting said adapter to said sleeve with said clutch element therebetween being compressed with force applied by said shear pin means.

2. The torque limiting device of claim 1 wherein at least two of said shear pin means are employed equally spaced around said shaft.

3. The torque limiting device of claim 1 wherein said clutch element is a ring positioned in a corresponding groove on the face of said adaptor.

4. The torque limiting device of claim 1 wherein said adaptor includes a flange to which is bolted said power transmission device.

5. The torque limiting device of claim 1 wherein said power transmission device is a gear, a sprocket, or a pulley.

6. The torque limiting device of claim 1 wherein said device additionally comprises an actuator plate pressed against said sleeve by said shear pin means with spring means compressed between said actuator plate and said sleeve; and warning means structured and positioned to be contacted by said actuator plate and adapted to be activated when said shear pin means is broken and said actuator plate is moved away from said sleeve by release of the compression of said spring means.

7. The torque limiting device of claim 1 which additionally comprises a bushing located between said adaptor and said shaft.

8. A device for limiting the maximum torque which can be transmitted between a shaft driven by a power means and a power transmission element rotated by said shaft; the device comprising:

(a) a tubular adapter which is freely rotatable around said shaft and to which is firmly attached said power transmission element;

(b) a sleeve firmly attached to said shaft and rotatable therewith;

(c) a friction clutch element adapted to be sandwiched between said adapter and said sleeve, and free of contact with said driving shaft; and (d) one or more shear pin elements connecting said sleeve to said adapter with said friction clutch element therebetween, said shear pin elements adapted to provide compressive force on said clutch element.

9. The device of claim 8 wherein said shear pin elements are two diametrically opposed shear bolts positioned respectively through drilled holes in said sleeve aligned with drilled holes in said adapter and fastened in position by nuts.

10. The device of claim 8 wherein said friction clutch element is a ring of material of high coefficient of friction positioned in a groove in said adaptor and adapted to be compressed against said sleeve.

11. The device of claim 8 in combination with an actuator plate which switches off said power means when said shear pin elements break causing axial movement of said actuator plate away from said sleeve.

* * * * *